United States Patent
Novak et al.

(10) Patent No.: US 9,134,835 B2
(45) Date of Patent: Sep. 15, 2015

(54) DETECTING AND FILTERING EDGE TOUCH INPUTS

(71) Applicant: Lenovo (Singapore) Pte. Ltd., Singapore (SG)

(72) Inventors: Joshua Neil Novak, Wake Forest, NC (US); Bruce Douglas Gress, Durham, NC (US); Debra Kay Kobs-Fortner, Cary, NC (US); Neal Robert Caliendo, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 51 days.

(21) Appl. No.: 14/158,104

(22) Filed: Jan. 17, 2014

(65) Prior Publication Data

US 2015/0205394 A1 Jul. 23, 2015

(51) Int. Cl.
*G06F 3/041* (2006.01)
*G06T 3/40* (2006.01)
*G06F 3/0488* (2013.01)
*G06F 3/038* (2013.01)

(52) U.S. Cl.
CPC .............. *G06F 3/041* (2013.01); *G06F 3/038* (2013.01); *G06F 3/0418* (2013.01); *G06F 3/0488* (2013.01); *G06T 3/4007* (2013.01)

(58) Field of Classification Search
None
See application file for complete search history.

(56) References Cited

U.S. PATENT DOCUMENTS

| | | |
|---|---|---|
| 8,924,894 B1 * | 12/2014 | Yaksick et al. ................. 715/863 |
| 2013/0159941 A1 * | 6/2013 | Langlois et al. ............... 715/863 |
| 2014/0304651 A1 * | 10/2014 | Johansson et al. ............ 715/810 |
| 2014/0362053 A1 * | 12/2014 | Holmgren et al. ............ 345/175 |

* cited by examiner

*Primary Examiner* — Muhammad N Edun
(74) *Attorney, Agent, or Firm* — Ference & Associates LLC

(57) ABSTRACT

An aspect provides a method, including: detecting, on a touch screen of an information handing device, user input; determining, using a processor, that the user input occurs within a predetermined edge region of the touch screen; adjusting, using a processor, display output of the touch screen based on the user input that occurs within a predetermined edge region; and filtering, using a processor, the user input that occurs within a predetermined edge region such that the user input does not commit an input action on the information handling device. Other aspects are described and claimed.

20 Claims, 3 Drawing Sheets

DETECTING AND FILTERING EDGE TOUCH INPUTS

BACKGROUND

Information handling devices ("devices") come in a variety of forms, for example laptop computing devices, tablet computing devices, smart phones, e-readers, navigation devices, and the like. Such devices are often mobile and carried by a user or otherwise routinely accessed by the user.

Currently a common user interface device is a touch sensitive surface, e.g., a touch screen display included with a tablet computing device. Such devices typically have a 10-25 mm edge surrounding the touch screen display. This non-functional bezel or edge area allows for easier internal board/antenna mounting. Additionally, when the user is holding the tablet, it provides an area for the user to place hands/fingers and hold the tablet display without actually touching the input area of the touch screen display, avoiding committing of inadvertent actions via touching in the active input area.

BRIEF SUMMARY

In summary, one aspect provides a method, comprising: detecting, on a touch screen of an information handing device, user input; determining, using a processor, that the user input occurs within a predetermined edge region of the touch screen; adjusting, using a processor, display output of the touch screen based on the user input that occurs within a predetermined edge region; and filtering, using a processor, the user input that occurs within a predetermined edge region such that the user input does not commit an input action on the information handling device.

Another aspect provides an information handling device, comprising: a touch screen that accepts user input; a processor; and a memory device that stores instructions accessible to the processor, the instructions being executable by the processor to: detect, on the touch screen, user input; determine that the user input occurs within a predetermined edge region of the touch screen; adjust display output of the touch screen based on the user input that occurs within a predetermined edge region; and filter the user input that occurs within a predetermined edge region such that the user input does not commit an input action on the information handling device.

A further aspect provides a product, comprising: a storage device having processor executable code stored therewith, the code comprising: code that detects, on a touch screen of an information handing device, user input; code that determines, using a processor, that the user input occurs within a predetermined edge region of the touch screen; code that adjusts, using a processor, display output of the touch screen based on the user input that occurs within a predetermined edge region; and code that filters, using a processor, the user input that occurs within a predetermined edge region such that the user input does not commit an input action on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
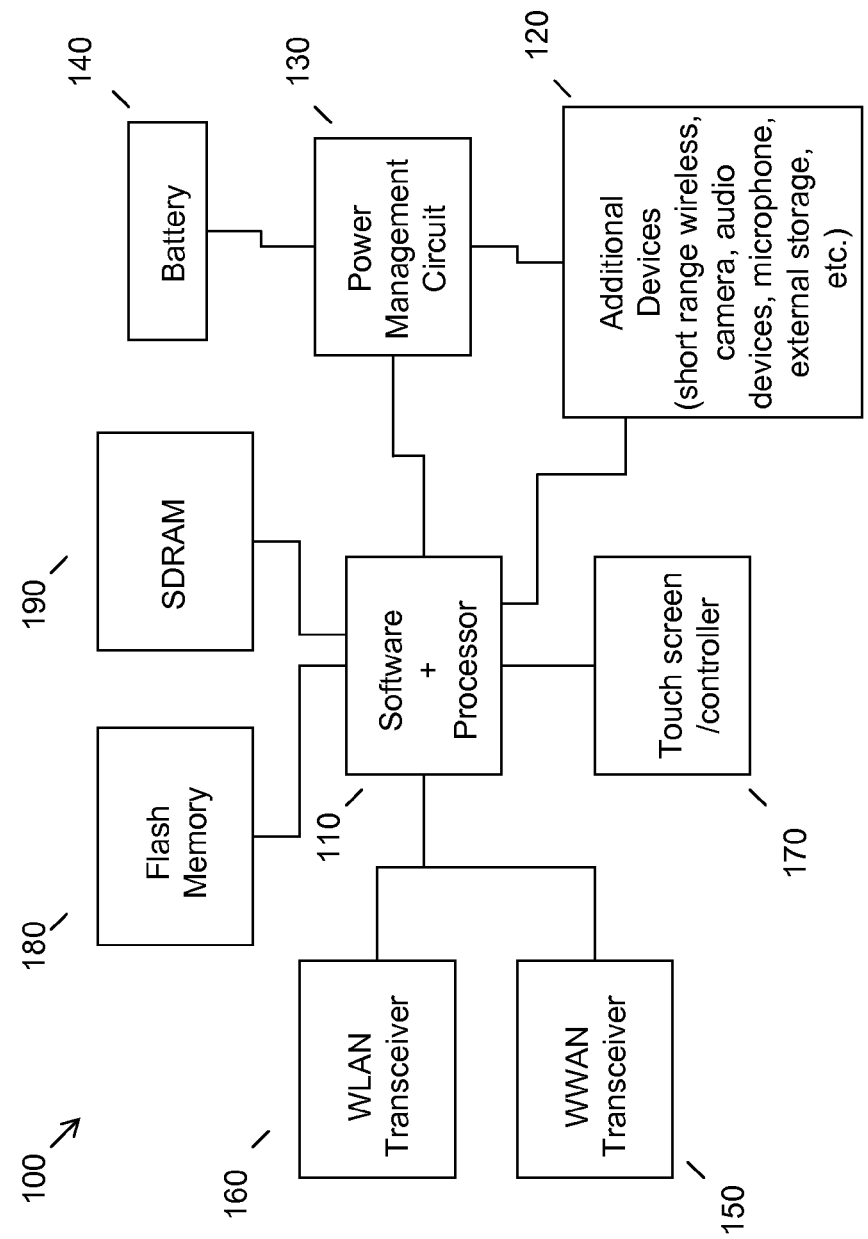
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In existing devices, the touch screen display is made smaller than the device enclosure. That is, existing devices include a bezel or non-functional edge area surrounding the touch screen. With the device enclosure bigger than the display, the user can hold the edge of the device without touching the display, thus avoiding inadvertent input.

An embodiment allows the device enclosure to be as small as possible. For example, in an embodiment, the touch screen display may extend the entire length and width of the upper surface of the device or otherwise the touch screen display may be formed as close to the non-functional edge of the device as possible.

An embodiment removes or significantly reduces the non-functional edge and extends the functional touch screen's physical footprint while still avoiding inadvertent user inputs from committing actions on the device. In an embodiment, software is provided, e.g., integrated into the device operating system (OS) and/or a device controller, that detects/determines the difference between a user input into the periphery or functional edge (hereinafter, predetermined edge area) of the touch screen that is meant or intended as committal user input, e.g., a quick touch, tap, click or swipe input to commit an action on the device, e.g., launch an application, etc., as compared to non-committal user input or other contacts, e.g., a user holding the device along the outside edge of the touch screen to physically manipulate the device.

An embodiment therefore determines a predetermined edge area around the functional touch screen. Having this predetermined edge area, if an embodiment detects that the user is simply holding the device, then an embodiment filters or deadens any touch points under and/or around where the user is currently providing user input. An embodiment nonetheless permits the user to use the predetermined edge area for functional input. For example, if a user provides input to the predetermined area and this is not mapped to an input to be filtered (e.g., the user does not hold the input over a predetermined time), an embodiment will register the user input and commit an appropriate action.

Additionally, after an embodiment filters or deadens the predetermined edge area (or portion thereof), once the user removes the input, e.g., lifts a finger from the touch screen, the touch points that were previously deadened, may be re-activated and thereafter an embodiment allows touches to again be registered as committal inputs.

If the user wants to affirmatively activate a deadened or filtered predetermined edge area, then a user may simply provide an input, e.g., tap or swipe input, that is not mapped to filtering and/or is mapped to an activation function, to the area to be activated. Thus a user may take advantage of the additional size of the touch screen without being encumbered by unnecessary registering of user inputs in the predetermined edge area.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
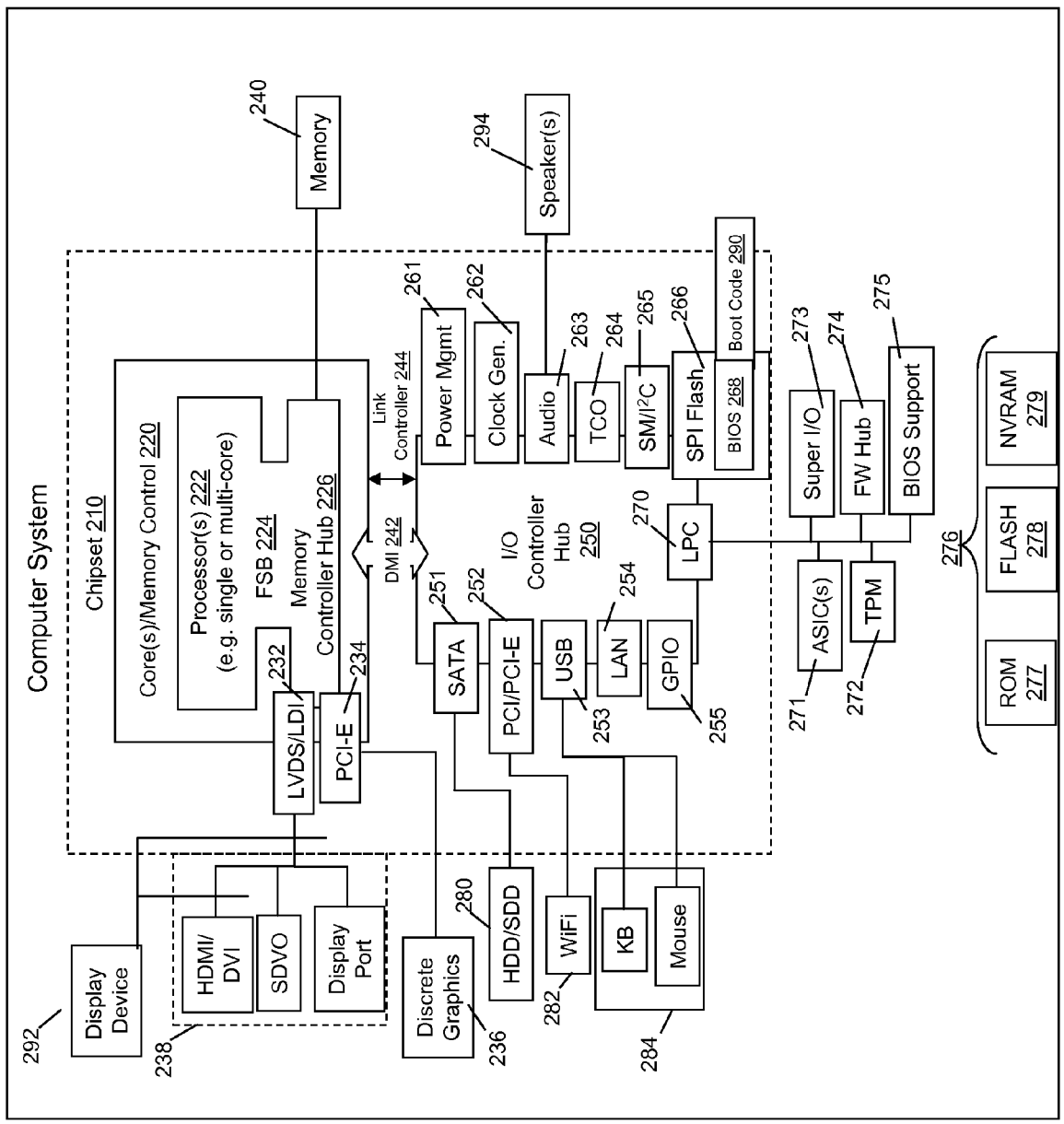
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as a smart phone, a tablet computing device, a laptop computing device, etc., that include a touch sensitive surface that accepts user inputs, e.g., touch screen display. An embodiment provides for extending the physical footprint of the touch sensitive surface while simultaneously providing intelligent filtering of user inputs to the additional areas thereof. As a non-limiting example, a tablet device and touch screen are described with reference to FIG. 3. It will be readily appreciated, however, that the principles and operations described in connection with the non-limiting examples may be extended to other devices, e.g., smart phone, laptop computer, etc., and other component devices, e.g., digitizers/pen input devices, etc.

Figure 3:
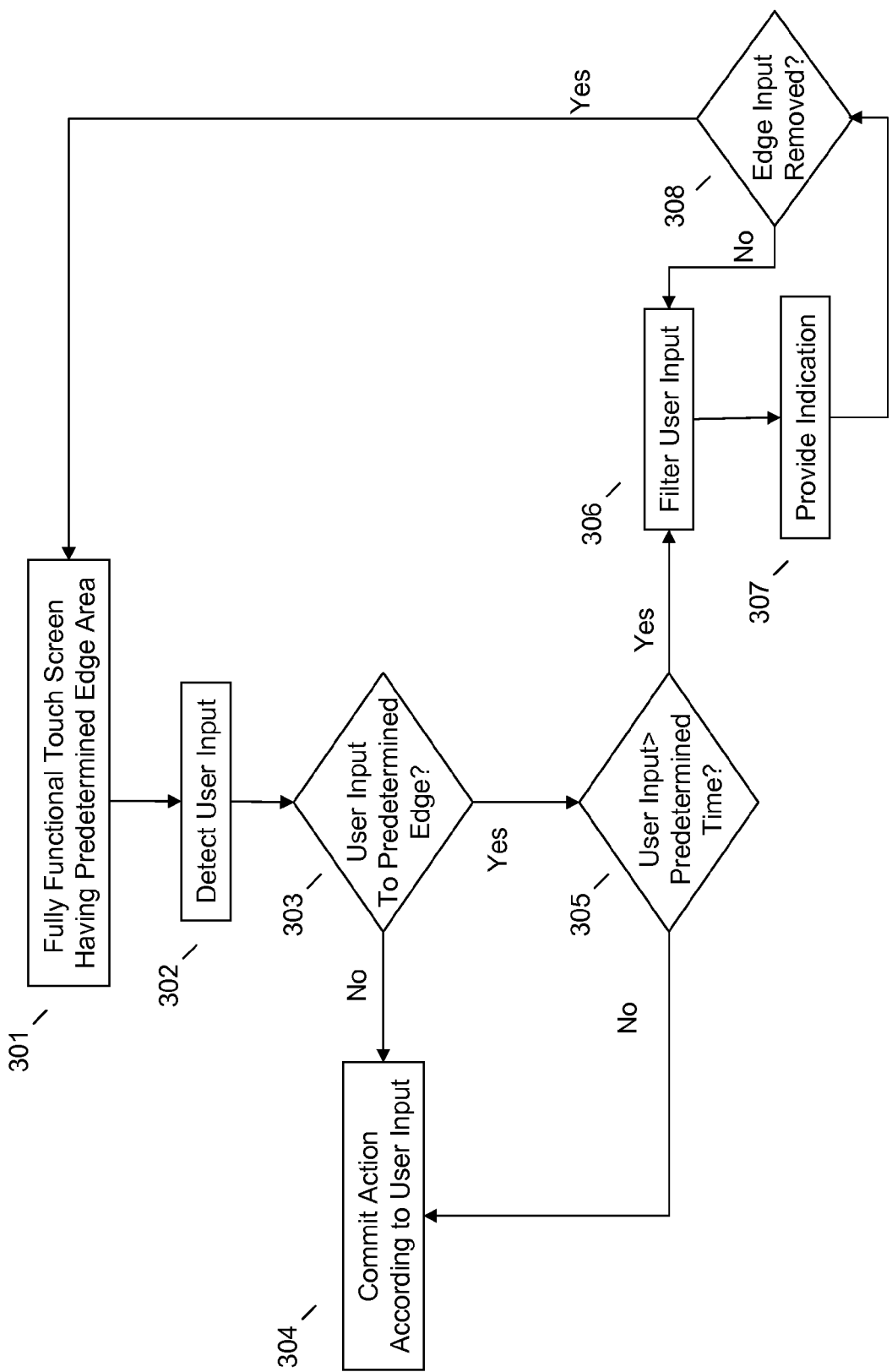
FIG. 3 illustrates an example method of detecting and filtering edge touch inputs.

Referring to FIG. 3, an example method of detecting and filtering edge touch inputs is illustrated. An embodiment provides a fully functional touch screen, i.e., physically extending to the edge of the tablet's upper surface (or nearly so). As such, an embodiment may not provide a conventional bezel or non-functional edge area in which a user may grasp without providing inputs.

Accordingly, in the fully functional touch screen, an embodiment defines a predetermined edge area therein 301. For example, an embodiment may define touch points lying within, e.g., 10-25 mm of the physical edge(s) of the touch screen as the predetermined edge area. If a user input is detected at 302, an embodiment determines if the user input is at a point within the predetermined area at 303. If not, the user has provided a touch input at an area within the edge area, e.g., centrally located within the touch screen, and an action may be committed at 304.

If it is determined, however, that the user input is within the predetermined edge area at 303, an embodiment may or may not execute an action, as follows. If the user holds or the input persists for a predetermined time, which may vary as further described herein, as determined at 305, an embodiment may filter the user input at 306, i.e., not committing an action otherwise associated with the input (e.g., launching of an application, committing an input action within an application, etc.).

If, however, the user input does not persist beyond a predetermined time, as determined at 305, an embodiment allows the user to provide this input as committal input and executes an action associated therewith. As with the predetermined area itself, the predetermined time used at 305 may vary depending on circumstances, e.g., user history of device use, the particular area or sub area within the touch screen, active applications, device orientation, user selection or inputs defining this variable, etc. Thus, an embodiment intelligently distinguishes non-committal input, e.g., a user simply holding the device within the predetermined edge area, versus committal input, e.g., a user tapping on an icon located within the predetermined edge area.

As described herein, an embodiment may provide an indication at 307 of the filtering, e.g., a visual indication co-located with the user input point of contact. For example, an embodiment may gray out or otherwise provide a visual indication that an area or sub area is being disregarded (i.e., is not accepting functional user input). The visual indication may take a variety of forms, e.g., grayed out oval area co-located with the user's finger, grayed out edge illustrating to the user the entire pre-defined edge area (or portion thereof), etc. Moreover, an embodiment may adjust the output to the display, e.g., move or resize the display output to not occupy an area underneath the area that the user is holding the screen. This may also comprise reflowing the display output as well as resizing the entire edge of the output.

If a user thereafter removes the edge input, e.g., as determined at 308, an embodiment may thereafter re-enable the predetermined edge area to provide a fully functional touch screen 301. Otherwise, an embodiment may continue to filter the input 306, e.g., while the user continues to hold the device in the predetermined edge area.

An embodiment may immediately re-enable the predetermined edge area, wait a predetermined time, or re-enable the predetermined edge area responsive to activating input. For example, similar to a user being able to provide committal input to the predetermined edge area in the first instance, e.g., at 304, an embodiment may re-enable the predetermined area responsive to a user affirmatively providing an activating input thereto.

Thus, if an embodiment determines user input into the predetermined area, e.g., while filtering is being provided, an embodiment may determine if this input is mapped to an activating input, e.g., an input indicative of committal input such as a tap, a swipe, etc. Thus, if an embodiment determines that the input is an activating input, an embodiment may re-enable the predetermined area and/or not filter the activating input, i.e., commit an action responsive thereto.

As an example use case, taking a standard tablet having an extended touch screen (extended to the edge of the device), a typical user will pick up the tablet with one hand, putting all of the fingers on the bottom and their thumb on the top of the tablet. This would put their thumb on the touch screen. When this happens, according to an embodiment, a software service running on the tablet detects that the user is touching the tablet near the edge (within a predefined edge are) and that the user is touching it for longer than a predetermined (but modifiable) period of time.

At this point, an embodiment creates a grayed out area, e.g., directly under the user's thumb and extended slightly beyond, to demonstrate that any touches under the user's thumb are ignored. The user may use the opposite hand to swipe, launch, or touch any other part of the screen (including any other part on the predetermined edge area not subject to filtering).

At some point, the user may get tired and hold the opposite edge of the tablet with the other hand (again, fingers on bottom and thumb on top). Again, an embodiment creates a grayed out area under/around the user's thumb. Now, depending on the timing thresholds implemented, there may be two disabled touch areas on the touch screen. Finally, the user may release one or both of their hands. An embodiment would detect that the disabled touch areas are no longer being held and thus re-enable them for normal touch operations.

As will be appreciated from the foregoing examples, an embodiment provides a touch input surface that may be extended the entire length and width of a device surface. Although a conventional non-functional bezel may not be provided (or an exceedingly small non-functional bezel or edge area), an embodiment replicates such a non-functional area by intelligently filtering holding inputs provided from the user from committal inputs provided by the user. In this way, an embodiment facilitates provisioning of larger displays/touch interfaces without sacrificing the user's ability to hold and manipulate the device as they have become accustomed to.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, on a touch screen of an information handing device, user input;
   determining, using a processor, that the user input occurs within a predetermined edge region of the touch screen;
   adjusting, using a processor, display output of the touch screen based on the user input that occurs within a predetermined edge region; and
   filtering, using a processor, the user input that occurs within a predetermined edge region such that the user input does not commit an input action on the information handling device.

2. The method of claim 1, wherein said adjusting comprises providing an indication to the user of the filtering.

3. The method of claim 2, wherein the indication is a visual indication.

4. The method of claim 3, wherein the visual indication is co-located with a point of contact for the user input on the touch screen.

5. The method of claim 1, wherein the adjusting comprises re-sizing display output of the touch screen.

6. The method of claim 1, wherein the adjusting comprises re-flowing display output of the touch screen.

7. The method of claim 1, further comprising:
   determining that the user input does not persist for a predetermined time in the predetermined edge region; and
   committing an action on the information handling device according to the user input.

8. The method of claim 1, further comprising re-activating the predetermined edge region responsive to determining no user input has been received for a predetermined time.

9. The method of claim 1, further comprising activating the predetermined edge region responsive to determining user input conforming to a predetermined input.

10. The method of claim 9, wherein the predetermined input is selected from the group consisting of a swipe input and a tap input.

11. An information handling device, comprising:
    a touch screen that accepts user input;
    a processor; and
    a memory device that stores instructions accessible to the processor, the instructions being executable by the processor to:
    detect, on the touch screen, user input;
    determine that the user input occurs within a predetermined edge region of the touch screen;
    adjust display output of the touch screen based on the user input that occurs within a predetermined edge region; and
    filter the user input that occurs within a predetermined edge region such that the user input does not commit an input action on the information handling device.

12. The information handling device of claim 11, wherein to adjust comprises providing an indication to the user of the filtering.

13. The information handling device of claim 12, wherein the indication is a visual indication.

14. The information handling device of claim 13, wherein the visual indication is co-located with a point of contact for the user input on the touch screen.

15. The information handling device of claim 11, wherein to adjust comprises re-sizing display output of the touch screen.

16. The information handling device of claim 11, wherein to adjust comprises re-flowing display output of the touch screen.

17. The information handling device of claim 11, wherein the instructions are further executable by the processor to:
   determine that the user input does not persist for a predetermined time in the predetermined edge region; and
   commit an action on the information handling device according to the user input.

18. The information handling device of claim 11, wherein the instructions are further executable by the processor to re-activate the predetermined edge region responsive to determining no user input has been received for a predetermined time.

19. The information handling device of claim 11, wherein the instructions are further executable by the processor to activate the predetermined edge region responsive to determining user input conforming to a predetermined input.

20. A product, comprising:
   a storage device having processor executable code stored therewith, the code comprising:
   code that detects, on a touch screen of an information handing device, user input;
   code that determines, using a processor, that the user input occurs within a predetermined edge region of the touch screen;
   code that adjusts, using a processor, display output of the touch screen based on the user input that occurs within a predetermined edge region; and
   code that filters, using a processor, the user input that occurs within a predetermined edge region such that the user input does not commit an input action on the information handling device.

* * * * *